(12) United States Patent
Singer et al.

(10) Patent No.: US 11,399,154 B2
(45) Date of Patent: Jul. 26, 2022

(54) PRESENTATION SYSTEM AND PRESENTATION METHOD

(71) Applicant: UNIVERSITÄT KASSEL, Kassel (DE)

(72) Inventors: Kilian Talo Theodor Singer, Kassel (DE); Samuel Thomas Dawkins, Mainz (DE)

(73) Assignee: UNIVERSITÄT KASSEL, Kassel (DE)

( * ) Notice: Subject to any disclaimer, the term of this patent is extended or adjusted under 35 U.S.C. 154(b) by 0 days.

(21) Appl. No.: 17/255,616

(22) PCT Filed: Jun. 26, 2019

(86) PCT No.: PCT/EP2019/066983
§ 371 (c)(1),
(2) Date: Dec. 23, 2020

(87) PCT Pub. No.: WO2020/002421
PCT Pub. Date: Jan. 2, 2020

(65) Prior Publication Data
US 2021/0274127 A1 Sep. 2, 2021

(30) Foreign Application Priority Data

Jun. 26, 2018 (DE) ..................... 10 2018 115 302.3

(51) Int. Cl.
*H04N 7/14* (2006.01)
*G02B 27/28* (2006.01)
(Continued)

(52) U.S. Cl.
CPC ........... *H04N 7/142* (2013.01); *G02B 27/288* (2013.01); *G03B 15/10* (2013.01); *H04N 5/23203* (2013.01); *H04N 5/265* (2013.01)

(58) Field of Classification Search
USPC ............................................. 348/14.02–14.9
See application file for complete search history.

(56) References Cited

U.S. PATENT DOCUMENTS 5,257,306 A   10/1993   Watanabe
6,042,235 A   3/2000   Machtig et al.
(Continued)

FOREIGN PATENT DOCUMENTS

DE            69223450 T2   4/1998
DE       112010001819 T5   6/2012
(Continued)

OTHER PUBLICATIONS

Citation of Office Action created on May 11, 2019 in related/corresponding DE Application No. 10 2018 115 302.3.
(Continued)

*Primary Examiner* — Maria El-Zoobi
(74) *Attorney, Agent, or Firm* — Patent Portfolio Builders PLLC (57) ABSTRACT

A presentation system and method for the joint display by a playback system of a monitor image and a camera image, recorded by a video camera, of a presenter, involves the monitor image and the camera image being superposed in a mixer for display by the playback system. A monitor with a display is provided in order to display the monitor image for a presenter situated in front of the monitor, a semi-transparent mirror being arranged in front of the display, and the video camera being positioned such that it detects the presenter mirrored via the semi-transparent mirror. The at least one video camera of the presentation system is an infrared camera.

20 Claims, 3 Drawing Sheets

(51) Int. Cl.
*G03B 15/10* (2021.01)
*H04N 5/232* (2006.01)
*H04N 5/265* (2006.01)

(56) References Cited

U.S. PATENT DOCUMENTS

| | | |
|---|---|---|
| 8,488,042 B2 | 7/2013 | Robinson et al. |
| 9,270,933 B1 | 2/2016 | Jiang |
| 2003/0174292 A1 | 9/2003 | White |
| 2004/0196359 A1 | 10/2004 | Blackham |
| 2008/0297589 A1 | 12/2008 | Kurtz et al. |
| 2010/0188478 A1* | 7/2010 | Robinson ............... H04N 7/15 348/E7.084 |
| 2012/0224019 A1 | 9/2012 | Samadani et al. |
| 2015/0138303 A1 | 5/2015 | White |
| 2016/0188831 A1 | 6/2016 | Kurtz et al. |
| 2016/0227164 A1* | 8/2016 | Klug ................... G02B 5/1842 |
| 2017/0039867 A1* | 2/2017 | Fieldman ........... H04N 21/2187 |

FOREIGN PATENT DOCUMENTS

| | | |
|---|---|---|
| EP | 0581221 A1 | 2/1994 |
| WO | 2003101101 A1 | 12/2003 |
| WO | 2005109090 A2 | 11/2005 |
| WO | 2007087142 A2 | 8/2007 |
| WO | 2011153358 A2 | 12/2011 |

OTHER PUBLICATIONS

International Search Report dated Nov. 5, 2019 in related/corresponding International Application No. PCT/EP2019/066983.
Written Opinion dated Nov. 5, 2019 in related/corresponding International Application No. PCT/EP2019/066983.

* cited by examiner

PRESENTATION SYSTEM AND PRESENTATION METHOD

BACKGROUND AND SUMMARY OF THE INVENTION

Exemplary embodiments of the invention relate to a presentation system for the joint display of a monitor image and a camera image, recorded using a video camera, of a presenter by a playback system, wherein the monitor image and the camera image are superimposed in a mixer for display by the playback system. A monitor having a display screen is provided in order to display the monitor image for a presenter located in front of the monitor, wherein a partially-transmissive mirror is arranged in front of the display screen, and wherein the at least one video camera is positioned so that it captures the presenter reflected via the partially-reflective mirror. Exemplary embodiments of the invention furthermore relate to a method in order to display a camera image, which is recorded using a video camera, of a presenter, jointly with a monitor image using a playback system.

In the case of presentations in front of a larger audience, the presenter is often recorded using a video camera and the image captured by the video camera is displayed using a playback system, for example a projector having associated projection screen. In a typical presentation or lecture situation, the presenter frequently refers to a monitor image which comprises, for example, texts or graphics. The monitor image is generally displayed to the auditorium in a computer-assisted manner with the aid of a separate playback system or as a background or foreground base image on the mentioned playback system together with the presenter.

When the presenter turns toward the playback system in order to make reference to the monitor image, he turns his back to his audience and accordingly loses the contact with his audience. To prevent this, presenters often use a further monitor, for example in the form of a laptop, which stands in front of him, so that he can see the monitor image himself and can be facing toward the audience at the same time. However, if the presenter looks at this monitor, he cannot look into the camera simultaneously, whereby an irritating display of the presenter together with the monitor image results on the playback system. This effect occurs particularly clearly if the monitor image is not static, for example, it is changed or developed by a touchscreen input or the use of a digital pencil on the monitor of the presenter during the presentation.

A similar situation results in studio television transmissions when a monitor wishes to look into the camera, on the one hand, and is supposed to point at something, which is either really arranged behind or in front of him or is only overlaid at all for the spectator, for example a weather map, on the other hand.

The situation of a video conference is also comparable thereto, in which a participant looks at the image of the remote participant on a monitor and at the same time is recorded by a camera arranged adjacent to the monitor. If the participant looks at the monitor, he sees his interlocutor—however, this person does not have the feeling that the participant makes eye contact with him. The interlocutor only has this feeling if the participant looks into the camera—then in turn he does not see his interlocutor on the monitor.

Such a presentation system can also be used in the scope of a video conference to work jointly on a document in an interactive manner. In this case, the presentation system is provided at least two times, wherein a camera and a monitor are associated with each conference participant and wherein the monitor is used simultaneously as a playback system for the camera image of the at least one other conference participant. The problem of the lack of eye contact also results in this case.

An arrangement for carrying out video conferences is known from US 2004/0196359 A1, in which the participant of the video conference observes the image of his interlocutor via a semi-transmissive curved mirror, while the camera recording him is arranged behind the mirror and records at least the face of the user through the mirror.

The use of the curved mirror enables the monitor to be positioned laterally in front of the participant, so that the monitor is not on the optical axis of the camera and therefore the viewpoint of the camera does not adjust to the face of the presenter. Nonetheless, the image of the monitor appears to come from the direction of the camera for the participant, so that he also looks into the camera when looking at the monitor. In this arrangement, however, the monitor does not face toward the participant, so that he cannot act interactively on the monitor, for example, cannot use a touch function on the monitor or cannot act on the monitor using a digital pencil, for example.

DE 11 2010 001 819 T5 describes a video conference system, in which a presenter stands in front of a partially-transparent display surface, on the rear side of which the monitor image is projected and through which the presenter is recorded by the camera. The structural size of the system is disadvantageous here, which is the fault of the rear projection of the monitor image on the display surface.

A system of the type described at the outset is known from U.S. Pat. No. 9,270,933 B1, which enables a video conference in which a participant is captured so that when looking at a monitor image, he looks into a camera at the same time. This is achieved in that the monitor has a reflective surface and the user is recorded by the camera reflected from this surface. To be able to separate the image of the user from that of the monitor in the camera recording, the monitor is switched dark temporarily in a periodically repeating manner, wherein only the camera recording continues to be processed during the dark switching. The duration of the dark switching is selected sufficiently short here that it does not result in a flickering monitor image for the user. However, the system has the disadvantage that due to the very short times for the camera recordings, a high level of camera sensitivity is required, which can result in a noisy image, or the participant has to be illuminated using high light intensity, which can result in dazzling. A further disadvantage is that existing monitors, for example a display screen of a laptop, cannot be switched dark in the required rapid succession readily and without hardware intervention, so that the method can only be carried out using monitor systems separately configured for this purpose.

Exemplary embodiments of the present invention are directed to a compact presentation system or a presentation method of the type mentioned at the outset in which a presenter can observe a monitor and also use the surface of the monitor interactively, for example using a digital pencil, and at the same time the presenter can be captured by a monitor so that when looking at the monitor, he looks into the camera. In this case, the system is to be able to be retrofitted in a simple manner with an existing monitor, without having to intervene in its hardware. It is additionally important that the spectator can comprehend where the presenter looks and points on the display screen.

A presentation system according to the invention of the type mentioned at the outset is distinguished in that the at least one video camera is an infrared camera.

By using the infrared camera, preferably in combination with an infrared illumination of the scene, i.e., of the presenter, the monitor image does not occur or only occurs with negligible intensity in the camera image. At the same time, an optimum impression results for the observer of the monitor, since he is not irritated by reflections of his own image. This effect can be enhanced still further by additionally using a display screen film or the like on the monitor, which preferably reflects infrared radiation, but is transmissive to visible light. Otherwise, a modification of the monitor is not necessary, in contrast, for example, to the case of the temporary dark switching of the monitor known from the prior art.

Due to the use of an infrared camera, the presenter and his surroundings can be sufficiently illuminated without the presenter being disturbed by the light sources themselves or by reflections of the light sources or the illuminated surroundings on the monitor.

In the scope of the application, an infrared camera is to be considered to be a video camera, the intensity of which in the infrared wavelength range, i.e., at wavelengths greater than approximately 780 nanometers (nm) is significantly higher than in the range of visible light, i.e., at wavelengths in the range of approximately 400-750 nm. This sensitivity distribution can be achieved, for example, by corresponding sensors of the video camera and/or filters placed in front.

Due to the recording of the presenter reflected in the monitor, the presenter looks both at the items of information on the monitor and also in the direction of the camera. Since the presenter is not recorded through the monitor by the video camera, a typical monitor can be used, which has a flat and compact structure.

In one advantageous embodiment of the presentation system, the partially-transmissive mirror is placed flatly on the display screen in parallel thereto. It can be integrated, for example, as a protective glass for the display screen into the monitor. The partially-transmissive mirror preferably moreover has a touch-sensitive sensor surface, whereby the monitor can be used as a "touchscreen", for example to draw interactively on the monitor. The presentation system can then be used as a blackboard or "whiteboard".

In a further advantageous design of the presentation system, a polarizing filter is arranged in front of the at least one video camera. In this case, a polarizing filter, in particular a polarizing filter film extending flatly over the entire display screen, is arranged between the display screen of the monitor and the partially-transmissive mirror. Alternatively thereto, a monitor can also be used which emits polarized light due to its functional principle. A polarizing filter in front of the video camera, which blocks the light that is polarized inherently or due to the polarizer placed in front of the monitor, has the effect that the light emitted by the monitor does not reach the video camera. The monitor image which the presenter sees is thus not visible in the camera image. The polarizing filter in front of the video camera and the polarizer can have crossed polarization planes, for example, if a linear polarization of the light is used to hide the monitor image. Alternatively, the monitor image can also be hidden via a circular or elliptical polarization.

In an alternative embodiment of the presentation system thereto, a color filter or a viewing angle filter is arranged between the display screen of the monitor and the partially-transmissive mirror. The monitor image can also be further suppressed in the camera image in this way. An additional suppression of the monitor image in a time domain is also possible, for example in that the displays on the monitor take place stroboscopically, for example via a switchable mirror. During the times in which the monitor image is visible, the video camera is electrically cycled off by an electronic camera shutter, or the monitor image is optically hidden by a switchable transmission filter arranged in front of the video camera.

In a further advantageous embodiment, the presentation system comprises a control computer having an image processing unit, which enables real-time image processing to equalize the camera image, wherein a modified camera image is relayed to the mixer. A distortion of the camera image resulting due to the angling of the camera in relation to the monitor can be corrected in real time by the image processing unit, so that both the monitor image and also the presenter are played back correctly positioned in relation to one another in the playback system. This is relevant in particular if the presenter looks or points at the monitor in order to also be able to correctly infer from the output image where the presenter is looking or pointing. In a further embodiment, alternatively or additionally thereto, the monitor image which the presenter sees can be pre-distorted, so that congruency of the two images (monitor image and camera image) in the output image thus also results again.

In a further advantageous embodiment, the presentation system is designed so that the modified camera image is relayed via a network to a remote mixer. The remote mixer is preferably connected to a remote monitor. This monitor located remotely from the presenter functions, on the one hand, as a playback system and, on the other hand, is part of a further presentation system, whereby the presentation system is usable as a video conference system.

In a further advantageous embodiment of the presentation system, at least one further mirror is arranged in a beam path between the at least one video camera and the partially-transmissive mirror, wherein the presenter is captured reflected via the at least one further mirror and via the partially-transmissive mirror by the at least one video camera. Greater flexibility in the positioning of the video camera is achieved by the at least one further mirror.

In a further advantageous embodiment of the presentation system, a further camera is provided and arranged to record a color image of the presenter, on the basis of which a coloring of the camera image and/or the monitor image can be performed. In this way, the infrared image, which is otherwise played back in black-and-white or in grayscale, of the presenter can be colored again in order to enable a natural color playback. The further camera is preferably oriented directly on the presenter, i.e., not in reflection geometry. The coloring can make use here of algorithms or artificial intelligence, in particular self-learning algorithms. In an alternative embodiment, instead of the further camera image, a static color image can also be used, the colors of which are then transferred to the moving infrared image.

In a presentation method according to the invention, at least one video camera captures a presenter reflected via a partially-transmissive mirror arranged in front of a display screen of a monitor, on which a monitor image is displayed, in a camera image in an infrared wavelength range. The camera image is then modified in real time by an image processing unit and/or the monitor image is distorted before its display on the monitor. The possibly distorted monitor image and the modified camera image are superimposed in a mixer for display by the playback system. The advantages mentioned in conjunction with the presentation system result.

In one advantageous refinement of the presentation method, in the step of modifying, the camera image is distorted and/or edge trimming and/or a detail enlargement and/or a position correction and/or a rotation correction and/or reflection takes place.

In a further advantageous refinement of the presentation method, the playback system comprises a monitor of a further presentation system. The monitor image and the modified camera image of the presenter (in this case referred to as a participant) superimposed with it are thus displayed as a monitor image on a monitor, which is in turn used by a further participant as parts of the further presentation system. Its camera image is superimposed in a comparable manner with the monitor image of the first-mentioned participant, so that the arrangement of the two presentation systems enables a video conference to be carried out.

BRIEF DESCRIPTION OF THE DRAWING FIGURES

The invention will be explained in greater detail in the following on the basis of exemplary embodiments with the aid of figures. In the figures.

DETAILED DESCRIPTION

Figure 1:
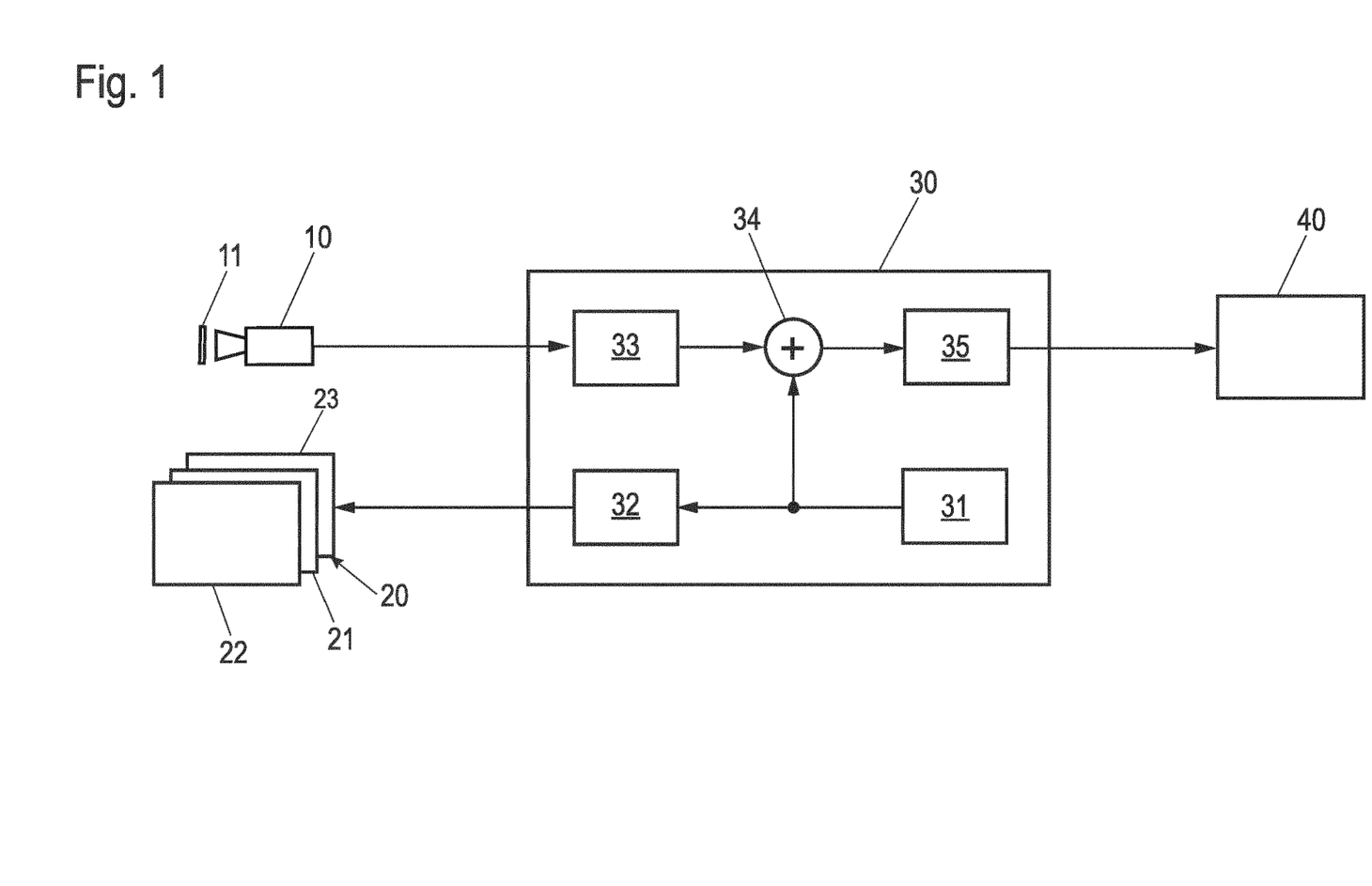
FIG. 1 shows a schematic illustration of a presentation system for carrying out a presentation method.
Figure 2:
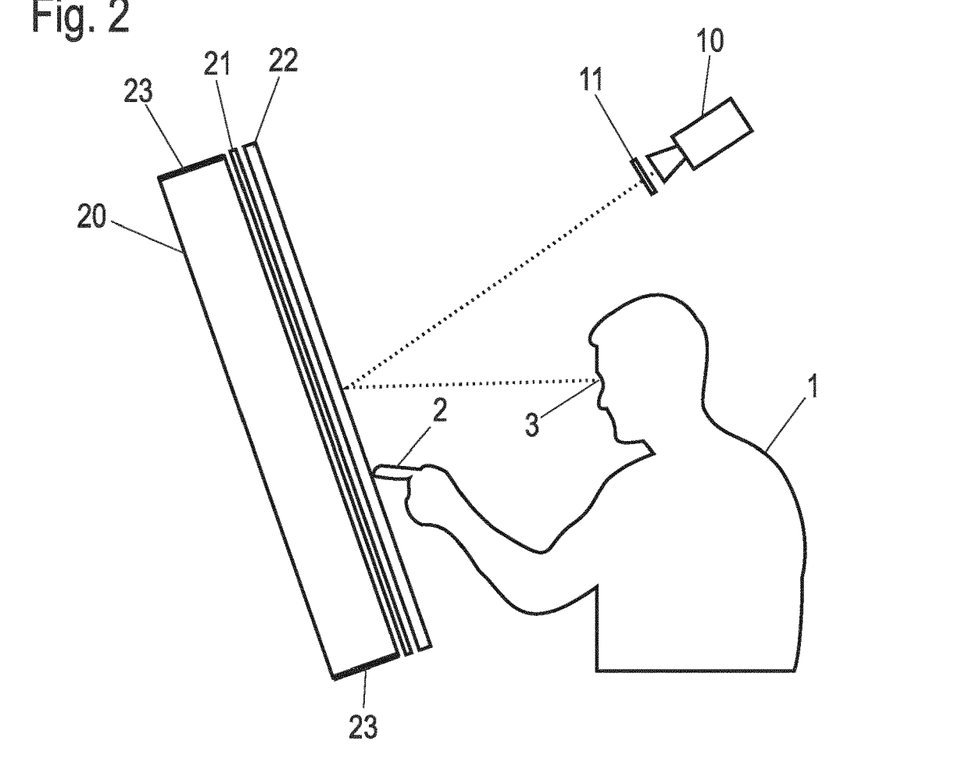
FIG. 2 shows details of the arrangement of several components of the presentation system shown in FIG. 1.

FIG. 1 shows an exemplary embodiment of a presentation system according to the application in the form of a schematic block diagram. FIG. 2 shows the geometrical arrangement of parts of the presentation system relative to one another and in relation to a presenter using the presentation system.

The presentation system comprises a video camera 10 (also referred to hereinafter as a camera 10), in front of the optical unit of which a polarizing filter 11 is arranged. Furthermore, the presentation system comprises a monitor 20, on the display screen (i.e., display surface) of which a polarizing filter film 21 as a polarizer and a partially-transmissive mirror 22 are placed. The video camera 10 is an infrared camera in the illustrated exemplary embodiment, the sensitivity of which is greater at wavelengths in the infrared range than in the visible range.

The polarizing filter film 21 and the partially transmissive mirror 22 are planar, as is the display surface of the monitor 20.

As explained in greater detail hereinafter, the polarizing filter film 21 can be omitted if the monitor 20 as such emits polarized light. In general, backlit LCD (liquid crystal display) monitors emit polarized light. If the monitor 20 is constructed on the base of a self-illuminating technology, for example having (possibly organic) light-emitting diodes, in contrast, the polarizing filter film 21 is advantageously used.

The partially-transmissive mirror 22 can be placed separately on the display screen of the monitor 20, but the partially-transmissive mirror 22 can also be an integral component of the monitor 20. It is crucial that light can both pass through the partially-transmissive mirror 22, and also a part of the light incident from the front on the partially-transmissive mirror 22 is reflected.

FIG. 2 shows the arrangement of the camera 10 and the monitor 20 in relation to one another and relative to a presenter 1 who uses the presentation system. This presenter is advantageously located centrally in front of the monitor 20, so that he can observe an image output by the monitor 20. The camera 10 is arranged inclined above the presenter 1 in such a way that an image of the presenter 1, which is reflected from the partially-transmissive mirror 22, is captured by the camera 10. In the scope of the application, a "presenter" is to be understood as any user of a presentation system, no matter what purpose the presentation system is used for. In these terms, video conference participants or moderators are also to be considered "presenters". The illustrated observation angle, at which the presenter 1 looks at the monitor 20, is variable here as long as the camera 10 can be arranged and aligned so that it can capture the image of the presenter 1 reflected from the partially-transmissive mirror 22. An optionally dark background behind the camera 10 reduces the reflections on the monitor 20 for the presenter 1 and thus facilitates the reading.

Figure 3:
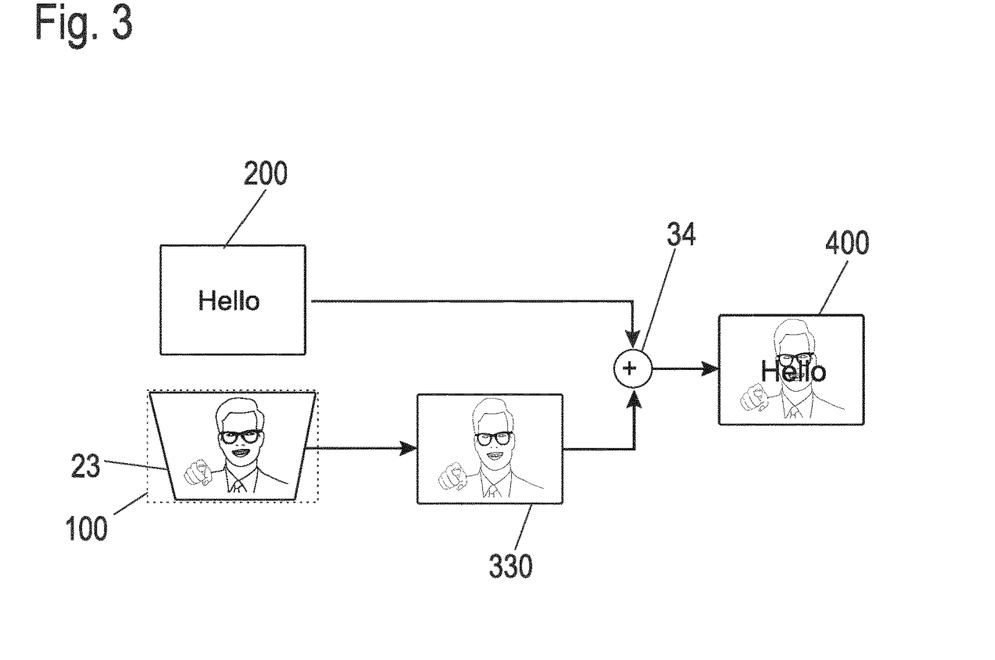
FIG. 3 shows a schematic illustration of the presentation method, which can be carried out, for example using the presentation system of FIG. 1.

As in turn can be seen in FIG. 1, both the camera 10 and also the monitor 20 are connected to a control computer 30. The control computer 30 comprises a monitor image generator 31, for example a presentation program which provides images ("slides") for a presentation. These are relayed to a first graphics unit 32 (also called graphics card), which is connected to the monitor 20 and displays an image output by the monitor image generator 31 on the monitor 20. FIG. 3 schematically shows such a monitor image 200, which is output by the monitor 20. The monitor image 200 is symbolized in FIG. 1 in the form of data which are output by the monitor image generator 31.

The presenter 1 sees the monitor image 200 on the monitor 20 in front of him and can point with fingers 2 at elements of the monitor image 200 or direct his eyes 3 to sections of the monitor image 200.

During this, the presenter 1 is captured by the camera 10, which outputs a camera image 100 in real time. This is also shown in FIG. 3. In FIG. 1, the camera image 100 is again symbolized in the form of data, which are transmitted from the camera 10 to the control computer 30.

Due to the arrangement of the camera 10 obliquely in relation to the monitor 20 and the partially-transmissive mirror 22, edges 23 of the monitor 20 reproduced in the camera image 100 are distorted, for example like a trapezoid. Parts of the camera image 100 reflected from the partially-transmissive mirror 22 are not distorted due to the physical nature of the reflection, however. Moreover, the camera image 100 can comprise a larger section than is reflected from the partially-transmissive mirror 22.

Due to the use of an infrared camera as the video camera 10, the monitor image is hidden in the camera image 100. An optimum impression for the observer of the monitor 20—also in the dark—may be achieved by a combination of the infrared camera with infrared illumination of the scene and possibly in addition a display screen film on the monitor 20, which preferably reflects infrared radiation, but is transmissive to visible light.

Due to the use of the infrared camera as the video camera 10, the presenter 1 and his surroundings can be sufficiently illuminated, without the presenter 1 being disturbed by the light sources themselves or by reflections of the light sources or the illuminated surroundings on the monitor. A color impression of the camera image 100 may then be achieved by using a further camera, which possibly creates a true color image at lower pixel resolution. This true color image can be used for simultaneous coloring of the monitor image 200, for example using artificial intelligence. A static color image of the presenter 1 can also be used as a color template for the coloring of the camera image 100.

The camera is focused on the presenter 1. This has the result that elements in the plane of the partially-transmissive mirror 22 cannot be sharply captured by the camera 10, since the depth of field range of the camera 10 generally does not extend this far in normal ambient illumination. It is therefore advantageous if the camera 10 does not record the image of the monitor 20 as much as possible, since it would only be displayed fuzzily.

So as not to have the monitor image 200 reach the camera 10, the polarizing filter 11 is additionally arranged in front of the camera 10 in the illustrated example. It is set so that light emitted by the monitor 20, which is polarized inherently or due to the polarizing filter film 21 placed in front, does not reach the camera 10, but rather is hidden by the polarizing filter 11. For this reason, the monitor image 200 which the presenter 1 sees is furthermore suppressed in the camera image 100. If the polarizing filter film 22 polarizes linearly, for example, the polarizing filter 11 is aligned so that the polarizing filter film 21 and the polarizing filter 11 have polarization planes crossed in relation to one another.

In one refinement of this arrangement, a reflective polarization film can be used, which combines the properties of the polarizing filter film 21 and the partially-transmissive mirror 22 with minimal losses and accordingly forms both the polarizing filter film 21 and also the partially-transmissive mirror 22.

Instead of a combination of polarizing filter 11 and polarizing filter film 21, an angle-dependent transmission filter attached to the display screen, also called a viewing angle filter, can be used to hide the monitor image 200 from the camera image 100.

A monitor 20 can also additionally be used, which has narrowband color emitters, for the wavelength of which the camera 10 is as insensitive as possible or is made insensitive by corresponding upstream filters.

An additional suppression of the monitor image 200 in a time domain is also possible, for example in that the displays on the monitor 20 take place stroboscopically, for example via a switchable mirror. During the times in which the monitor image 200 is visible, the camera 10 is electrically cycled off by an electronic camera shutter, or the monitor image 20 is optically hidden by a switchable transmission filter, which is arranged in front of the camera 10.

The camera 10 is connected inside the control computer 30 to an image processing unit 33, which performs a transformation of the camera image 100 in real time, using which, for example, the trapezoidal distortion of the edge 23 of the monitor 20 resulting due to the arrangement of the camera 10 is compensated for (cf. FIG. 3). This is relevant in particular to superimpose the camera image 100 with the monitor image 200 so that the two images are congruent in the output image 400 and the observers of the output image 400 can comprehend which point in the monitor image 200 the presenter 1 is actually looking or pointing at.

Alternatively or additionally to the modification of the camera image 100, the playback of the monitor image 200 on the monitor 20 for the presenter can be pre-distorted so that congruency of the two images on the output image 400 again results.

It is to be noted that this modification of camera image 100 and/or playback of the monitor image 200 on the monitor 20 can also be used in presentation systems in which a separation of the image of the presenter in the camera image 100 is not carried out by using an infrared camera, but rather, for example by dark switching of the monitor 20 in the recording phases of the camera.

Optionally, edge trimming or detail enlargement and/or a position correction and/or rotation correction and/or mirroring can additionally be performed. The image processing unit 33 correspondingly outputs a modified camera image 330, as can be seen in FIG. 3. The above-mentioned simultaneous coloring can also be performed in the image processing unit 33.

The control computer 30 furthermore comprises a second graphics unit 35 (i.e. a further graphics card), to which both the monitor image 200 and also the modified camera image 330 are supplied via a mixer 34. The mixer 34 superimposes the two images, possibly with adjustable degree of brightness and/or transparency. A playback system 40, on which the superposition of the monitor image 200 and the modified camera image 330 is displayed as the output image 400, is connected to the second graphics unit 35.

In the case of a lecture or a presentation, the playback system 40 can be, for example a projection system (projector), which displays the output image 400 on a projection surface behind the presenter 1. The second graphics unit 35 can additionally or alternatively also be designed to transmit ("stream") or store the output image 400 in a data format.

The presentation system shown or the presentation method explained in conjunction with FIG. 3 offers the advantage that the presenter 1 can observe the monitor image 200 and nonetheless a frontal recording of the presenter 1 can be presented for the audience in the output image 400. The output image 400 on the playback system 40 moreover shows the monitor image 200, so that the playback system 40 unifies both perspectives necessary or of interest for the presentation, the presenter who is frontally visible and the material to which the presenter 1 refers, in one image.

When the presenter 1 fixes on specific points or regions of the monitor image 20 with his eyes 3 or points at them with his finger, the corresponding eye movement and alignment or pointing direction is also to be made out on the output image 400. The presenter 1 thus behaves completely naturally with respect to the monitor image 200, whereby it is easy for the audience to comprehend where the focus of the presenter 1 is presently directed.

In one refinement of the described presentation system, the partially-transmissive mirror 22 can be provided with a touch-sensitive surface and can thus be used as an input element for the control computer 30. A capacitively operating touch-sensitive surface is preferably provided, which can be operated using the finger 2 or a digital input pencil (not shown here).

In this design, the presenter 1 can operate the monitor 20 with the finger like a touchscreen or, if a corresponding interactive program is used, can influence the monitor image 200. The presentation system can be used like a tablet, in that the presenter 1 places markings or writes with the aid of the digital input pencil on the partially-transmissive mirror and thus on the monitor 20. The audience sees the resulting "tablet image" and simultaneously the presenter in a frontal view on the playback monitor 40.

In a further modification of the presentation system shown in FIGS. 1 and 2, the camera 10 can be dynamically moved either directly or via mirrors, in order to obtain an optimum image impression, even if the person is not located centrally in front of the display screen.

In a further modification of the presentation system, the camera 10 can also be implemented multiple times and can be laterally attached, for example, and in each case can observe the presenter 1 via reflection on the monitor 20. Images of the plurality of cameras 10 can then be assembled to form one image, which appears to originate from a "virtual" camera. Such a virtual camera can be moved to positions, for example by means of three-dimensional calculations, which would otherwise not be accessible. The option is also possible in conjunction with multiple, for example two cameras 10, which are designed as infrared cameras. Images of these cameras 10 are then preferably firstly combined to form an image of a virtual camera, which is then colored on the basis of items of color information of an additional true color camera.

In a further modification of the presentation system shown in FIGS. 1 and 2, greater flexibility in the positioning of the camera 10 can be achieved by at least one additional mirror, which is arranged between the camera 10 and the partially-transmissive mirror 22. This mirror can in particular also be transparent to the visible light in order to be less interfering.

For example, it is possible to use the monitor of a laptop computer as the monitor 20. Laptop computers frequently have a camera arranged centrally above the monitor 20, which is oriented toward the user of the laptop. Using an inclined additional mirror arranged in front of the plane of the monitor 20 and above the monitor 20 from the presenter, an image of the presenter can be recorded by the integrated camera of the laptop computer reflected on the partially-transmissive mirror 22 and then reflected on the additional mirror. The additional mirror can be placed, for example using a small telescopic or gooseneck mount having clamp fastening on the upper edge of the laptop, whereby the laptop computer represents camera, monitor, and control computer of a presentation system.

In a further modification of the presentation system shown in FIGS. 1 and 2, a mobile variant can be implemented by using a possible small, for example wireless camera on the body of the presenter, which in turn records the observer via reflection on the monitor, for example of a mobile telephone or a tablet computer. In this case, the perspective correction is to be adapted in real time to the geometrical situation, which is variable under certain circumstances. Outlines of the monitor can be detected for this purpose, for example. A suitable angle between the monitor and the camera can be tracked manually or automatically by means of servomotors, for example.

Figure 4:
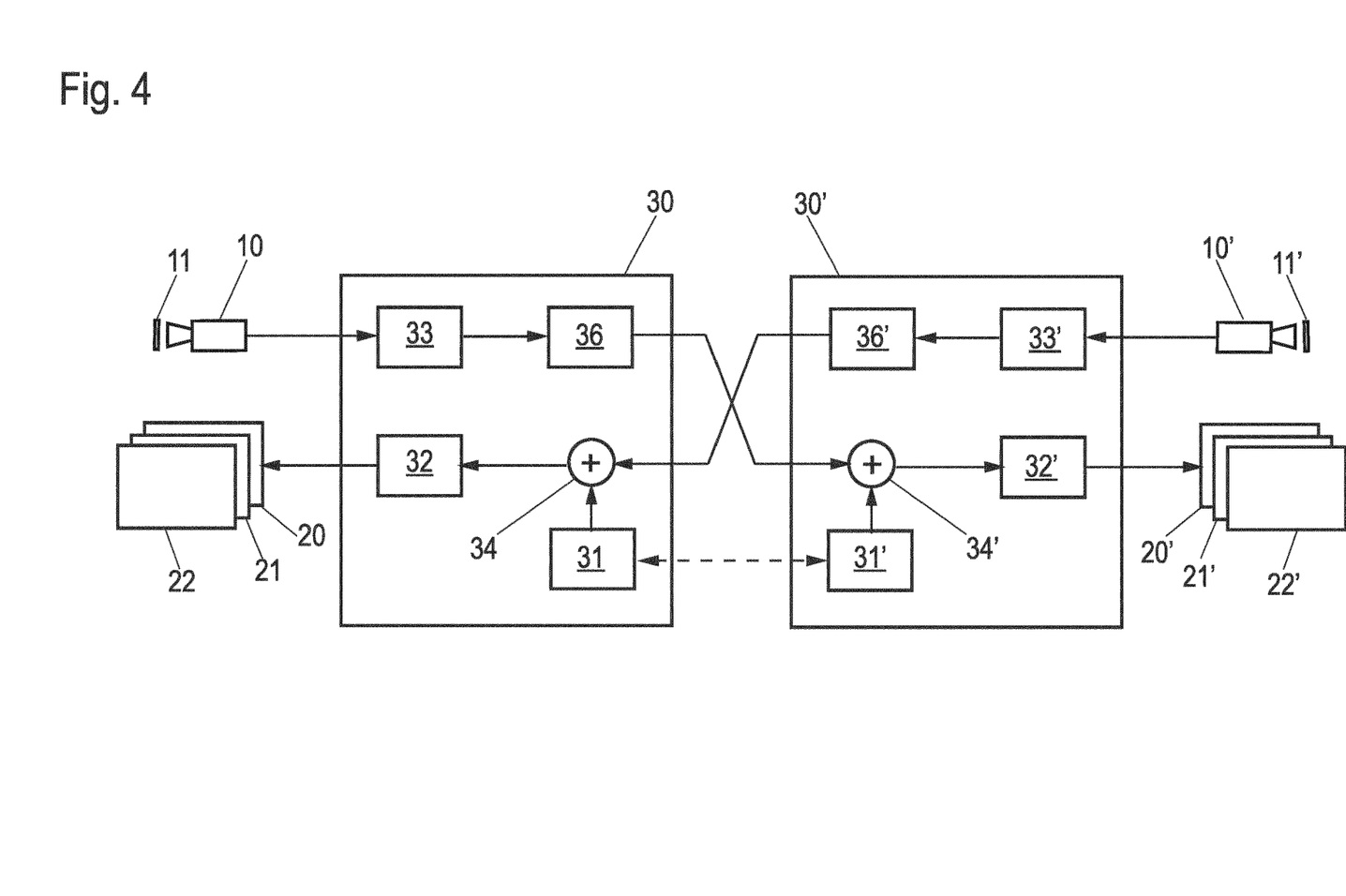
FIG. 4 shows a schematic illustration of a presentation system designed to carry out video conferences.

An arrangement of two interconnected presentation systems is shown in FIG. 4 in a schematic illustration similar to FIG. 1. Identical reference signs identify identical or identically-acting elements in this figure as in the preceding figures.

The arrangement of FIG. 4 is designed as a video conference system for two participants by way of example here. Accordingly, components of the presentation system are provided twice and are each associated with a first or a second participant, respectively. The reference signs of components which are associated with the second participant are provided with an apostrophe for easier differentiability.

The arrangement comprises a camera 10, 10' having polarizing filter 11, 11' in front of it for each participant. Furthermore, a monitor 20, 20' having a polarizing filter film 21, 21' and a partially-transmissive mirror 22, 22' is provided for each participant. Each part of the arrangement furthermore has a control computer 30, 30', in which the data supplied by the camera 10, 10' are processed in an image processing unit 33, 33' to form a modified camera image 330, 330'. Reference is made to the embodiment of FIGS. 1 and 2 with respect to the geometrical arrangement of camera 10, 10' and monitor 20, 20'. In each of the two parts of the arrangement according to FIG. 4, the corresponding camera 10, 10' records the image of a presenter—in this exemplary embodiment called a participant—reflected via the monitor 20, 20' and in particular the partially-transmissive mirror 22, 22'.

In contrast to the above-described exemplary embodiment, in the present case the modified camera image 330, 330' is not transmitted via the mixer 34 to a second graphics unit 35, but rather via a network interface 36 to a mixer 34' of the second part of the arrangement. The modified camera image is supplied there with a monitor image 200, which is provided by a monitor image generator 31', to the first graphics unit 32', which transmits the superposition of the monitor image 200 and the modified camera image 330 to the monitor 20' for display for the second participant. The monitor 20' of the second participant thus forms the playback system 40 (cf. FIG. 1) in this exemplary embodiment. The entire part of the monitor 20, 20' or in each case a part thereof, for example in the form of a window, can be used as the playback system.

Vice versa, the camera image 100' of the second discipline is equalized by the image processing unit 33' and transmitted via the network interface 36' as the modified camera image 330' of the second participant to the control computer 30 of the first participant. A superposition also takes place here in a mixer 34 with the monitor image 200, which is provided by a monitor image generator 31. The superimposed images are output via the first graphics unit 32 on the monitor 20 of the first participant. The monitor image generators 31, 31' are preferably synchronized in both control computers 30, 30', so that in both cases the same monitor image 200 is mixed with the respective modified camera image 330, 330'. Two interconnected presentation systems are formed in this way, wherein the monitor 20, 20' of the one system also functions as the playback system of the other system.

Due to the described method, each of the two participants sees the monitor image 200 and his interlocutor, i.e., the respective other participant, on the monitor 20. Both participants can thus look simultaneously at the monitor image 200 and possibly process it, upon use of a touch-sensitive monitor 20, 20'. With suitable alignment of camera 10, 10' or monitor 20, 20' moreover both participants see themselves with eye contact.

A synchronization of the two monitor image generators 31, 31' is represented in FIG. 4 by a dashed arrow. It is apparent that the total of three connections thus shown between the control computers 30, 30' are formed by a single network connection. Of course, the modified camera images 330, 330' and the items of synchronization information for the monitor image 200 can be transmitted at different data rates and latencies in this case, however, to take into consideration the more quickly changing camera images 100, 100'.

In contrast to the illustration in FIG. 4, mixing of the modified camera image 330, 330' with the monitor image 200 can also take place in the respective control computer 30, 30' before a transmission takes place to the respective other control computer 30, 30'.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

LIST OF REFERENCE NUMERALS 1 presenter
2 finger
3 eye
10, 10' video camera
100 camera image
11, 11' polarizing filter
20, 20' monitor
200 monitor image
21, 21' polarizing filter film
22, 22' partially-transmissive mirror
23 edge
30, 30' control computer
31, 31' monitor image generator
32, 32' first graphics unit
33, 33' image processing unit
330 modified camera image
34, 34' mixer
35 second graphics unit
36, 36' network interface
40 playback system
400 output image

The invention claimed is:
1. A presentation system for the joint display of a monitor image and a camera image, the presentation system comprising:
a playback system including at least one video camera that records the camera image of a presenter;
a mixer that superimposes the monitor image and the camera image for display by the playback system;
a monitor having a display screen that displays the monitor image for the presenter, who is located in front of the monitor;
a further camera arranged to record a color image of the presenter, based on which coloring of the camera image is performed; and
a partially-transmissive mirror arranged in front of the display screen,
wherein the at least one video camera is positioned so that the at least one video camera captures the presenter reflected via the partially-transmissive mirror, and
wherein the at least one video camera is an infrared camera.
2. The presentation system of claim 1, wherein the partially-transmissive mirror is placed flatly on the display screen in parallel to the display screen.
3. The presentation system of claim 1, wherein the partially-transmissive mirror is integrated into the monitor as a protective glass for the display screen.
4. The presentation system of claim 1, wherein the partially-transmissive mirror has a touch-sensitive sensor surface.
5. The presentation system of claim 1, further comprising:
a polarizing filter arranged in front of the at least one video camera.
6. The presentation system of claim 5, further comprising:
a polarizer arranged between the display screen of the monitor and the partially-transmissive mirror.
7. The presentation system of claim 6, wherein the polarizer is a polarizing filter film extending flatly over an entirety of the display screen.
8. The presentation system of claim 1, further comprising:
a color filter or a viewing angle filter arranged between the display screen of the monitor and the partially-transmissive mirror.
9. The presentation system of claim 1, further comprising:
a control computer having an image processing unit, which uses real-time image processing to equalize the camera image to produce a modified camera image, wherein the modified camera image is relayed to the mixer.
10. The presentation system of claim 1, further comprising:
a control computer having an image processing unit, which uses real-time image processing to equalize the camera image to produce a modified camera image, wherein the modified camera image is relayed via a network to a remote mixer.
11. The presentation system of claim 10, wherein the remote mixer is connected to a remote monitor, which functions as a further playback system and is part of a further presentation system.
12. The presentation system of claim 1, further comprising:
at least one further mirror arranged in a beam path between the at least one video camera and the partially-transmissive mirror, wherein the presenter is captured by the at least one video camera reflected via the at least one further mirror and via the partially-transmissive mirror.
13. A presentation method for the joint display of a monitor image and a camera image, which is recorded using at least one video camera of a playback system, the method comprising:
displaying, on a monitor having a display screen, the monitor image for a presenter located in front of the monitor;
capturing, by the at least one video camera, the presenter reflected via a partially-transmissive mirror arranged in front of the display screen of the monitor in a camera image in an infrared wavelength range;
real-time processing, by an image processing unit, the camera image to generate a modified camera image or equalizing the monitor image before the monitor image is display on the monitor, wherein the real-time processing of the camera image comprises coloring the camera image using a color image of the presenter captured by a further camera; and
superimposing, by a mixer for the playback system, the monitor image and the modified camera image for display by the playback system.
14. The presentation method of claim 13, wherein the real-time processing of the camera image involves using a distorted input image, edge trimming an input image, detail enlargement of the input image, position correction of the input image, rotation correction of the input image, or mirroring the input image.

15. The presentation method of claim 13, wherein the playback system comprises a monitor of a further presentation system.

16. A presentation system, comprising:
a monitor having a display screen that displays a monitor image for a presenter located in front of the monitor;
a partially-transmissive mirror arranged in front of the display screen,
an infrared video camera that records an infrared camera image of the presenter, wherein the infrared video camera is positioned so that the infrared video camera captures the infrared image of the presenter reflected via the partially-transmissive mirror;
a color camera arranged to record a color image of the presenter, based on which coloring of the infrared camera image is performed; and
a mixer that superimposes the monitor image and the colored infrared camera image and outputs a video image of the monitor image superimposed on the colored infrared camera image.

17. The presentation system of claim 16, wherein the partially-transmissive mirror is placed flatly on the display screen in parallel to the display screen.

18. The presentation system of claim 16, wherein the partially-transmissive mirror is integrated into the monitor as a protective glass for the display screen.

19. The presentation system of claim 16, wherein the partially-transmissive mirror has a touch-sensitive sensor surface.

20. The presentation system of claim 16, further comprising:
a polarizing filter arranged in front of the at least one video camera; and
a polarizer arranged between the display screen of the monitor and the partially-transmissive mirror,
wherein the polarizer is a polarizing filter film extending flatly over an entirety of the display screen.

* * * * *